US012782968B2

(12) United States Patent
Chen et al.

(10) Patent No.: US 12,782,968 B2
(45) Date of Patent: Nov. 3, 2026

(54) MOWING METHOD AND APPARATUS, ROBOTIC LAWN MOWER, AND STORAGE MEDIUM

(71) Applicant: SHENZHEN MAMMOTION INNOVATION CO., LIMITED, Shenzhen (CN)

(72) Inventors: Jianlin Chen, Shenzhen (CN); Jidong Wei, Shenzhen (CN)

(73) Assignee: SHENZHEN MAMMOTION INNOVATION CO., LIMITED, Shenzhen (CN)

( * ) Notice: Subject to any disclaimer, the term of this patent is extended or adjusted under 35 U.S.C. 154(b) by 0 days.

(21) Appl. No.: 19/016,669

(22) Filed: Jan. 10, 2025

(65) Prior Publication Data

US 2025/0147520 A1 May 8, 2025

Related U.S. Application Data

(63) Continuation of application No. PCT/CN2023/105133, filed on Jun. 30, 2023.

(30) Foreign Application Priority Data

Jul. 12, 2022 (CN) ......................... 202210820976.8

(51) Int. Cl.
*G05D 1/648* (2024.01)
*A01D 34/00* (2006.01)
(Continued)

(52) U.S. Cl.
CPC ......... *G05D 1/6484* (2024.01); *A01D 34/008* (2013.01); *A01D 2101/00* (2013.01); *G05D 2105/15* (2024.01); *G05D 2107/23* (2024.01)

(58) Field of Classification Search
CPC ............. G05D 1/6484; G05D 2105/15; G05D 2107/23; A01D 34/008; A01D 2101/00
(Continued)

(56) References Cited

U.S. PATENT DOCUMENTS 4,621,959 A 11/1986 Kishi et al.
10,874,045 B2 12/2020 Balutis et al.
(Continued)

FOREIGN PATENT DOCUMENTS

CN 105511458 A 4/2016
CN 106818062 A 6/2017
(Continued)

OTHER PUBLICATIONS

First Office Action, mailed on Jun. 29, 2023, in CN application No. 202210820976.8.
(Continued)

*Primary Examiner* — Yazan A Soofi
(74) *Attorney, Agent, or Firm* — Getech Law LLC; Jun Ye

(57) ABSTRACT

According to a mowing method disclosed in embodiments of the present disclosure, a plurality of preset working regions are obtained in response to a mowing trigger request for a robotic lawn mower; a mowing sequence corresponding to the working regions is output based on region information of the working regions; a closed mowing route covering all the working regions is generated based on the mowing sequence, current position information of the robotic lawn mower, and a mowing direction, where a starting point and an ending point of the closed mowing route are the same; and the robotic lawn mower is controlled to perform a mowing operation based on the closed mowing route.

13 Claims, 6 Drawing Sheets

(51) Int. Cl.
*A01D 101/00* (2006.01)
*G05D 105/15* (2024.01)
*G05D 107/20* (2024.01)

(58) Field of Classification Search
USPC ..................................................... 701/25
See application file for complete search history.

(56) References Cited

U.S. PATENT DOCUMENTS

| | | | | |
|---|---|---|---|---|
| 10,884,427 | B2 * | 1/2021 | Sakaguchi | G01C 21/34 |
| 11,029,691 | B1 * | 6/2021 | Barboi | G05D 1/0219 |
| 11,493,923 | B2 * | 11/2022 | Zhong | G05D 1/0212 |
| 2012/0290165 | A1 * | 11/2012 | Ouyang | A01D 34/008 701/25 |
| 2013/0041526 | A1 * | 2/2013 | Ouyang | A01D 34/008 701/2 |
| 2016/0100522 | A1 * | 4/2016 | Yamauchi | A01D 34/008 701/25 |
| 2018/0004217 | A1 * | 1/2018 | Biber | G05D 1/0221 |
| 2021/0344371 | A1 | 11/2021 | LaMarr, Jr. | |

FOREIGN PATENT DOCUMENTS

| | | | |
|---|---|---|---|
| CN | 110801180 | A | 2/2020 |
| CN | 111256700 | A | 6/2020 |
| CN | 111562784 | A | 8/2020 |
| CN | 113359743 | A | 9/2021 |
| CN | 114089765 | A | 2/2022 |
| CN | 115250720 | A | 11/2022 |
| CN | 111487982 | A | 2/2024 |
| EP | 3363273 | A1 | 8/2018 |
| JP | 1988286911 | A | 11/1989 |
| WO | 2021206607 | A1 | 10/2021 |

OTHER PUBLICATIONS

Second Office Action, mailed on Jan. 30, 2024, in CN application No. 202210820976.8.

Examination Report, mailed on Oct. 15, 2025 in EP application No. 23838778.1.

International Search Report & Written Opinion, mailed on Aug. 21, 2023, in PCT/CN2023/105133.

Galceran Enric et al: "A survey on coverage path planning for robotics", Robotics and Autonomous Systems, vol. 61, No. 12, Sep. 20, 2013, pp. 1258-1276, XP028757878, ISSN: 0921-8890, DOI: 10.1016/J.ROBOT.2013.09.004.

Tan Chee Sheng et al: "A Comprehensive Review of Coverage Path Planning in Robotics Using Classical and Heuristic Algorithms", IEEE Access, IEEE, USA, vol. 9, Aug. 26, 2021, pp. 119310-119342, XP011876310, DOI: 10.1109/ACCESS.2021.3108177.

Timo Oksanen: "Path Planning Algorithms for Agricultural Field Machines", Helsinki University of Technology, Series A: Research Reports No. 31, Dec 1, 2007, XP055722226, DOI: 10.1002/rob.20300, retrieved from the Internet: URL:https://aaltodocaalto.fi/bitstream/handle/123456789/2976/isbn9789512290802.pdf?sequence=1&isAllowed=y on Aug. 13, 2020.

Communication pursuant to Article 94(3) EPC Mailed on Feb. 20, 2026, 12 pages.

EP23838778.1—Communication pursuant to Article 94(3) EPC Mailed on Jul. 31, 2026, 12 pages.

* cited by examiner

MOWING METHOD AND APPARATUS, ROBOTIC LAWN MOWER, AND STORAGE MEDIUM

CROSS-REFERENCES TO RELATED APPLICATION

The present application is a continuation of International Application No. PCT/CN2023/105133, filed on Jun. 30, 2023, which claims priority to Chinese Patent Application No. CN 202210820976.8, filed in the China National Intellectual Property Administration on Jul. 12, 2022, and entitled "MOWING METHOD AND APPARATUS, ROBOTIC LAWN MOWER, AND STORAGE MEDIUM", which is incorporated herein by reference in its entirety.

Technical Field

The present disclosure relates to the field of computer technologies, and in particular to an intelligent obstacle avoidance method, a robotic lawn mower, and a storage medium.

Background Art

Robotic lawn mowers are widely used for maintenance of home courtyard lawn and trimming of large grass. The robotic lawn mowers incorporate techniques such as motion control, multi-sensor fusion, path planning, etc. In order to control a robotic lawn mower to carry out a mowing operation, a mowing path needs to be planned for the robotic lawn mower so that all the working regions can be covered completely. There is currently a type of robotic lawn mower that travels based on a preset route. However, due to improper planning of the preset route, an actual route traveled by such robotic lawn mower is very long, which reduces the mowing efficiency while consuming more stored power of the robotic lawn mower.

SUMMARY OF THE INVENTION

Embodiments of the present disclosure provide an intelligent obstacle avoidance method, a robotic lawn mower, and a storage medium, which can generate an obstacle avoidance path adaptively based on an obstacle, thereby improving the obstacle avoidance efficiency and flexibility of the robotic lawn mower.

In a first aspect, an embodiment of the present disclosure provides a mowing method. The method includes:

- obtaining a plurality of preset working regions in response to a mowing trigger request for a robotic lawn mower;
- outputting a mowing sequence corresponding to the working regions based on region information of the working regions;
- generating a closed mowing route covering all the working regions based on the mowing sequence, current position information of the robotic lawn mower, and a mowing direction, where a starting point and an ending point of the closed mowing route are the same; and
- controlling the robotic lawn mower to perform a mowing operation based on the closed mowing route.

In a second aspect, an embodiment of the present disclosure provides a mowing method. The method includes:

- obtaining a preset working region in response to a mowing trigger request for a robotic lawn mower;
- generating a closed mowing route of the working region based on a region shape of the working region, current position information of the robotic lawn mower, and a mowing direction, where a starting point and an ending point of the closed mowing route are the same; and
- controlling the robotic lawn mower to perform a mowing operation based on the closed mowing route.

In a third aspect, an embodiment of the present disclosure provides a mowing apparatus. The apparatus includes:

- an obtaining module configured to obtain a plurality of preset working regions in response to a mowing trigger request for a robotic lawn mower;
- a sequencing module configured to output a mowing sequence corresponding to the working regions based on region information of the working regions;
- a generation module configured to generate a closed mowing route covering all the working regions based on the mowing sequence, current position information of the robotic lawn mower, and a mowing direction, where a starting point and an ending point of the closed mowing route are the same; and
- a control module configured to control the robotic lawn mower to perform a mowing operation based on the closed mowing route.

In a fourth aspect, an embodiment of the present disclosure provides a mowing apparatus. The apparatus includes:

- an obtaining module configured to obtain a preset working region in response to a mowing trigger request for a robotic lawn mower;
- a generation module configured to generate a closed mowing route of the working region based on a region shape of the working region, current position information of the robotic lawn mower, and a mowing direction, where a starting point and an ending point of the closed mowing route are the same; and
- a control module configured to control the robotic lawn mower to perform a mowing operation based on the closed mowing route.

In a fifth aspect, an embodiment of the present disclosure provides a robotic lawn mower, including a memory, a processor, and a computer program stored on the memory and executable on the processor. The processor, when executing the program, implements the steps of the mowing method of any one of the above.

In a sixth aspect, an embodiment of the present disclosure provides a storage medium storing a computer program. The computer program, when executed by a processor, causes the steps of the mowing method of any one of the above to be implemented.

BRIEF DESCRIPTION OF THE DRAWINGS

In order to more clearly describe the technical solutions in the embodiments of the present disclosure, the accompanying drawings necessary for describing the embodiments will be briefly described below. Apparently, the accompanying drawings in the description below merely show some of the embodiments of the present disclosure, and those skilled in the art would have obtained other drawings from these drawings without involving any inventive effort.

DETAILED DESCRIPTION OF EMBODIMENTS

Figure 1:
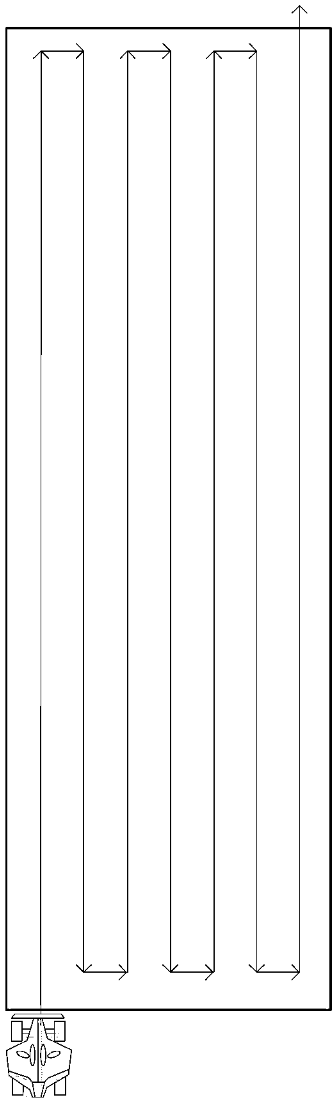
FIG. 1 is a schematic diagram of a scenario of a mowing method in an existing technical solution.

In existing technical solutions, although there is currently a type of robotic lawn mower on the market that travels based on a preset route, a starting point and an ending point of such robotic lawn mower traveling based on the preset route are not coordinate points of a same position. Therefore, the robotic lawn mower needs to return to the starting point after completing a mowing operation at the ending point, which wastes time and consumes more stored power of the robotic lawn mower. Referring to FIG. 1, FIG. 1 is a schematic diagram of a scenario of a mowing method in an existing technical solution. When a charging location of a robotic lawn mower is used as a starting point of a mowing route, the starting point and an ending point of the mowing route of the robotic lawn mower are located at different positions. As a result, after completing a mowing operation based on the mowing route and reaches the ending point of the mowing route, the robotic lawn mower goes back to the starting point of the mowing route due to a requirement of returning to the charging location for charging. Therefore, the robotic lawn mower travels more distances and consumes more power to return to the charging location.

The technical solutions in the embodiments of the present disclosure will be described clearly and completely below with reference to the accompanying drawings in the embodiments of the present disclosure. Apparently, the described embodiments are only some rather than all of the embodiments of the present disclosure. All the other embodiments obtained by those skilled in the art based on the embodiments of the present disclosure without creative efforts shall fall within the scope of protection of the present disclosure.

It should be noted that when an element is referred to as being "fixed to" or "disposed on" another element, it may be directly on or indirectly on another element. When an element is referred to as being "connected" to another element, it may be directly or indirectly connected to another element. In addition, the connection may have the function of fixing or circuit connection.

It should be understood that the orientation or positional relationships indicated by the terms "length", "width", "upper", "lower", "front", "rear", "left", "right", "vertical", "horizontal", "top", "bottom", "inner", "outer", etc. are based on the orientation or positional relationship shown in the accompanying drawings and are only for facilitating the description of the embodiments of the present disclosure and simplifying the description, rather than indicating or implying that an apparatus or an element referred to must have a particular orientation or be constructed and operated in a particular orientation, and therefore will not be interpreted as limiting the disclosure.

In addition, the terms "first" and "second" are merely used for the purpose of illustration, and cannot be construed as indicating or implying relative importance or implicitly indicating the number of technical features indicated. Thus, the features defined with "first" and "second" may explicitly or implicitly include one or more features. In the description of the embodiments of the present disclosure, "a plurality of" means two or more, unless specifically defined otherwise.

The embodiments of the present disclosure provide a mowing method and apparatus, a robotic lawn mower, and a storage medium.

The mowing apparatus may be integrated particularly in a microcontroller unit (MCU) of a robotic lawn mower, or integrated in an intelligent terminal or server. The MCU, also referred as a single-chip microcomputer or microcontroller, is designed to reduce the frequency and specifications of a central process unit (CPU) and integrates peripheral interfaces such as a memory, a timer, a USB, an analog to digital converter/digital to analog converter, a UART, a PLC and a DMA to form a chip-level computer so as to provide different combined controls for different applications. The robotic lawn mower may walk automatically, prevent collisions, return for charging automatically within a range, is provided with safety detection and battery level detection, and has a certain climbing ability, is especially suitable for lawn trimming and maintenance in places such as home courtyards, public green space, etc., and has the characteristics of automatic grass cutting, cleanup of grass chips, automatic rain protection, automatic charging, automatic obstacle avoidance, small form factor, electronic virtual fencing, network control, etc.

The terminal may be a smartphone, a tablet, a laptop, a desktop computer, a smart speaker, a smart watch, etc., but not limited to those. The terminal and the server may be connected directly or indirectly by means of wired or wireless communication, the server may be a separate physical server, a cluster or distributed system of multiple physical servers, or a cloud server which provides cloud services, cloud databases, cloud computing, cloud functions, cloud storage, network services, cloud communications, middleware services, domain name services, security services, CDNs and basic cloud computing services such as big data and artificial intelligence platforms, and is not limited in the present disclosure.

Detailed descriptions are provided below. It should be noted that the order in which the following embodiments are described is not intended to limit the order of precedence of the embodiments. In the following embodiments, a working region refers to a closed region formed by connecting at least three line segments within a same coordinate system in sequence. A boundary of the working region refers to a line segment used in enclosing the working region into the closed region. A mowing route refers to a line segment formed by connecting at least two coordinate points in a same coordinate system, where a start end of the line segment is a starting point of the mowing route, and a tail end of the line segment is an ending point of the mowing route. A transition route refers to a route that connects operation routes in different working regions, a route to the starting point, and a route back to the starting point from the ending point, that is, a route that the mowing machine travels but does not perform a mowing operation.

A mowing method includes: obtaining a plurality of preset working regions in response to a mowing trigger request for a robotic lawn mower; outputting a mowing sequence corresponding to the working regions based on region information of the working regions; generating a closed mowing route covering all the working regions based on the mowing sequence, current position information of the robotic lawn mower, and a mowing direction, where a starting point and an ending point of the closed mowing route are the same; and controlling the robotic lawn mower to perform a mowing operation based on the closed mowing route.

Figure 2:
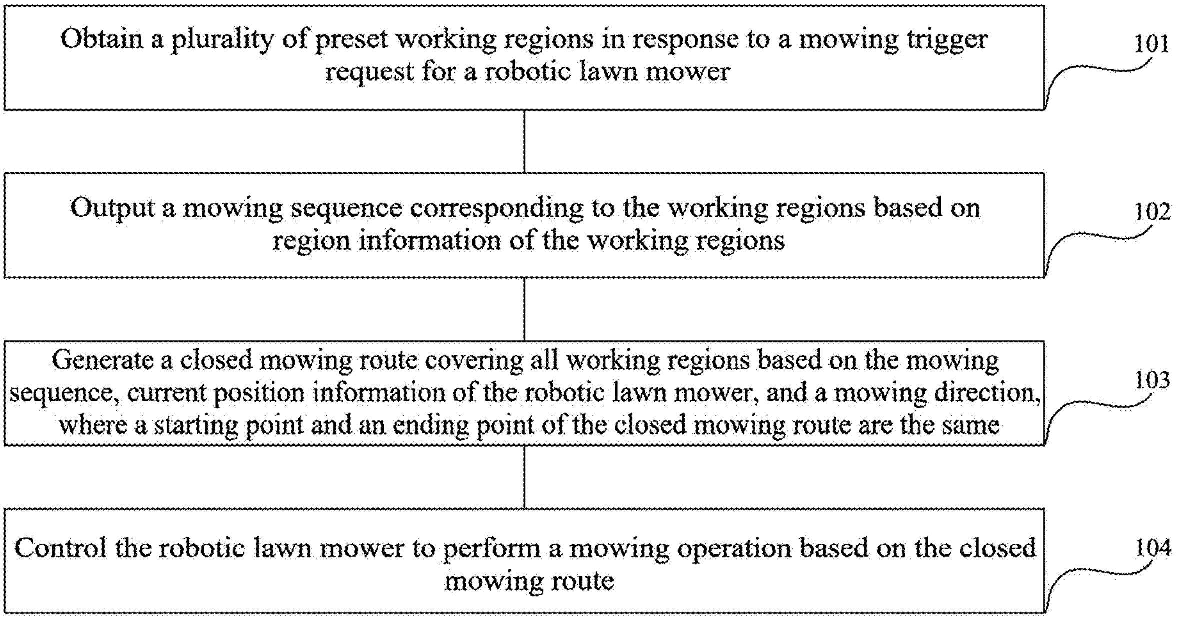
FIG. 2 is a schematic flowchart of a mowing method according to an embodiment of the present disclosure.

Referring to FIG. 2, FIG. 2 is a schematic flowchart of a mowing method according to an embodiment of the present disclosure. The mowing method may have a specific process as follows.

101: Obtain a plurality of preset working regions in response to a mowing trigger request for a robotic lawn mower.

The working region is a region where the robotic lawn mower performs mowing operations within a closed region with set boundaries. In this embodiment, the plurality of working regions are independent of each other. The robotic lawn mower enters another operation region for performing a mowing operation after completing a mowing operation in a working region. The mowing trigger request may be triggered by the robotic lawn mower itself, triggered by a server, or triggered by a user by means of hardware or software. As an example, a timed operation is required for the robotic lawn mower, and the mowing trigger request is triggered within a set time. As another example, the server sends a mowing trigger request according to a reported mowing trigging instruction. The user may also input mowing task information by means of a disclosure on a mobile phone, and the mobile phone generates a mowing trigger request for the robotic lawn mower from the mowing task information.

102: Output a mowing sequence corresponding to the working regions based on region information of the working regions.

In this embodiment, the region information of the working region includes a shape of the working region. For example, the working region may be a polygonal working region formed by connecting straight line segments as boundaries of the working region, or may be an irregularly shaped working region with curved boundaries. The region information of the working region further includes an area of the working region, etc. The mowing sequence corresponding to the working regions means that according to the mowing sequence, the robotic lawn mower completes a mowing operation in a working region before entering another operation region for performing a mowing operation. For example, the plurality of working regions are set, according to the mowing sequence, as a first mowing order working region, a second mowing order working region, . . . , and an $N^{th}$ mowing order working region.

Alternatively, the step of "outputting a mowing sequence corresponding to the working regions based on region information of the working regions" may specifically include:

(21) extracting region areas and region shapes from the region information of the working regions; and

(22) determining the mowing sequence corresponding to the working regions based on the region areas and the region shapes.

Figure 3:
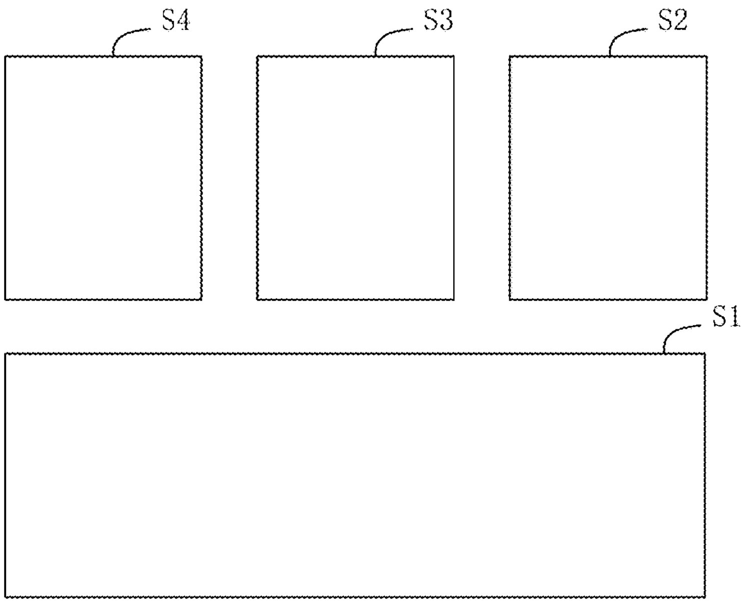
FIG. 3 is a schematic diagram of working regions sequenced based on a mowing sequence according to an embodiment of the present disclosure.

Referring to FIG. 3, FIG. 3 is a schematic diagram of working regions sequenced based on a mowing sequence according to an embodiment of the present disclosure. Based on the mowing sequence, the working regions may be ordered as a first mowing order working region S1, a second mowing order working region S2, a third mowing order working region S3, and a fourth mowing order working region S4.

In a specific embodiment, region areas are extracted from region information of the working regions, to determine the region area of each working region. The region area of each working region is then compared pairwise; and a working region with a largest region area is used as the first mowing order working region S1, a working region with a second largest region area is used as the second mowing order working region S2, and so on. In this way, the working regions are sequenced, thereby obtaining the mowing sequence corresponding to the working regions.

In another specific embodiment, region shapes are extracted from the region information of the working regions, to determine the region shape of each working region. A number of boundaries of each working region is determined based on the region shape, for example, the number of boundaries of a triangular working region is three, and the number of boundaries of a quadrilateral working region is four. And a working region with a largest number of boundaries is used as the first mowing order working region S1, the working region with a second largest number of boundaries is used as the second mowing order working region S2, and so on. In this way, the working regions are sequenced, thereby obtaining the mowing sequence corresponding to the working regions.

103: Generate a closed mowing route covering all the working regions based on the mowing sequence, current position information of the robotic lawn mower, and a mowing direction, where a starting point and an ending point of the closed mowing route are the same.

In this embodiment, the current position information of the robotic lawn mower is first determined, such as a working region in which the robotic lawn mower is currently located, and a position of the robotic lawn mower relative to a working region. The mowing direction of the robotic lawn mower may affect generation of the mowing route. For example, when the mowing direction of the robotic lawn mower is opposite to a direction of the first mowing order working region SI relative to the robotic lawn mower, the generated mowing route may turn back to reach the first mowing order working region S1.

It may be understood that for the closed mowing route whose starting point and ending point are the same, the robotic lawn mower may use any point on the closed mowing route as the starting point to start a mowing operation along the mowing route with the starting point being also the ending point. That is, the robotic lawn mower returns to the starting point after completing the mowing operation along the mowing route.

Alternatively, the step of "generating a closed mowing route covering all the working regions based on the mowing sequence, current position information of the robotic lawn mower, and a mowing direction" may specifically include:

(31) generating a mowing route corresponding to each of the working regions based on the mowing sequence, and the mowing direction of the robotic lawn mower, where the mowing route corresponding to each of the working regions is alternatively parallel to the longest boundary of the corresponding working region;

(32) connecting the generated mowing routes, to obtain the closed mowing route covering all the working regions, where the starting point and the ending point of the closed mowing route are both located at a current position of the robotic lawn mower.

Alternatively, in some embodiments, the step of "generating a mowing route corresponding to each of the working regions based on the mowing sequence, and the mowing direction of the robotic lawn mower" may specifically include:

(311) detecting a distance between a first mowing order working region and the current position of the robotic lawn mower;

(312) generating an initial mowing route of traveling along the mowing direction when it is detected that the distance between the first mowing order working region and the current position of the robotic lawn mower is greater than a preset threshold, where a starting point of the initial mowing route is located at the current position of the robotic lawn mower, and an ending point of the initial mowing route is located within the first mowing order working region; and (313) generating the mowing route corresponding to each of the working regions in sequence based on the initial mowing route and the mowing sequence.

Alternatively, in one embodiment, it is detected whether the initial mowing route passes through a working region; and when it is detected that the initial mowing route passes through a corresponding working region, adjusting the initial mowing route to a mowing route that the robotic lawn mower travels along a mowing boundary of the corresponding working region, where the working region is a closed region formed by connecting a plurality of line segments in sequence, and each of the line segments belongs to a mowing boundary of the working region.

Figure 4:
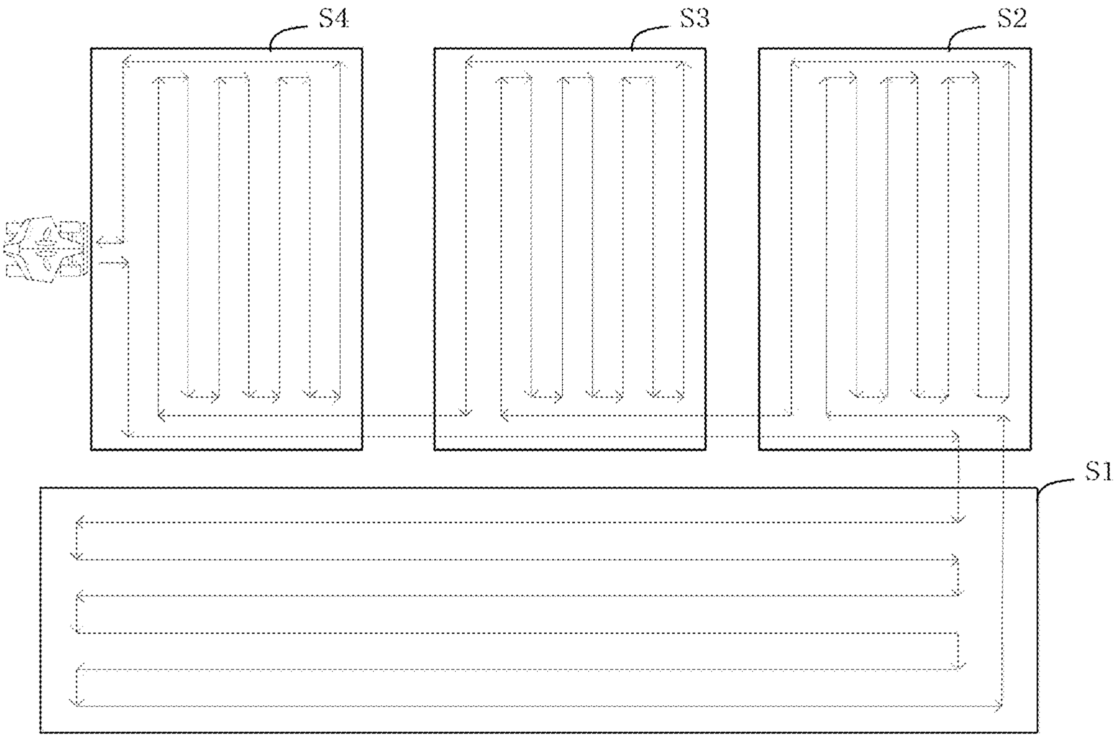
FIG. 4 is a schematic diagram of generating a closed mowing route according to an embodiment of the present disclosure.

In one embodiment, referring to FIG. 4, FIG. 4 is a schematic diagram of generating a closed mowing route according to an embodiment of the present disclosure. It may be understood that by detecting a distance between a first mowing order working region S1 and current position of a robotic lawn mower detected, it is found that the distance between the first mowing order working region S1 and the current position of the robotic lawn mower is greater than a preset threshold, and a fourth mowing order working region S4 is closer to the robotic lawn mower than the first mowing order working region S1. The first mowing order working region S1 is separated from the robotic lawn mower by a second mowing order working region S2, a third mowing order working region S3, and the fourth mowing order working region S4. Therefore, during generation of the mowing route, an initial mowing route for the robotic lawn mower to reach the first mowing order working region SI is first generated, where the initial mowing route passes through the second mowing order working region S2, the third mowing order working region S3, and the fourth mowing order working region S4. After the initial mowing route is generated, starting from the first mowing order working region S1, a mowing route is generated in the first mowing order working region S1, then, a mowing route is generated in the second mowing order working region S2, next, corresponding mowing routes are generated in sequence in the third mowing order working region S3 and the fourth mowing order working region S4 based on the mowing sequence, and finally, the mowing route of the fourth mowing order working region S4 is connected to an ending point (a starting point, that is, the current position of the robotic lawn mower).

104: Control the robotic lawn mower to perform a mowing operation based on the closed mowing route.

In the embodiments of the present disclosure, the robotic lawn mower obtains the plurality of preset working regions in response to the mowing trigger request for the robotic lawn mower, then, outputs the mowing sequence corresponding to the working regions based on the region information of the working regions, next, generates the closed mowing route covering all the working regions based on the mowing sequence, the current position information of the robotic lawn mower, and the mowing direction, where the starting point and the ending point of the closed mowing route are the same, and finally, controls the robotic lawn mower to perform the mowing operation based on the closed mowing route. In the mowing solution provided in the present disclosure, the mowing sequence corresponding to the working regions is output based on the region information of the working regions. Optimization of the mowing sequence may facilitate improving the mowing efficiency. Since the starting point and the ending point of the closed mowing route are the same, the robotic lawn mower does not need to start a mowing operation along a mowing route from a fixed starting point or to return to a fixed ending point after completing a mowing operation. Therefore, the mowing operation may be started at any time by using the current position of the robotic lawn mower as a starting point, which facilitates improving the mowing efficiency. Moreover, since the robotic lawn mower performs the mowing operation based on the closed mowing route whose starting point and ending point are the same, time for the robotic lawn mower to return from the ending point to the starting point may be saved. Therefore, the mowing route of the robotic lawn mower is optimized, the power consumption of the robotic lawn mower is reduced, and the mowing efficiency is improved.

Figure 5:
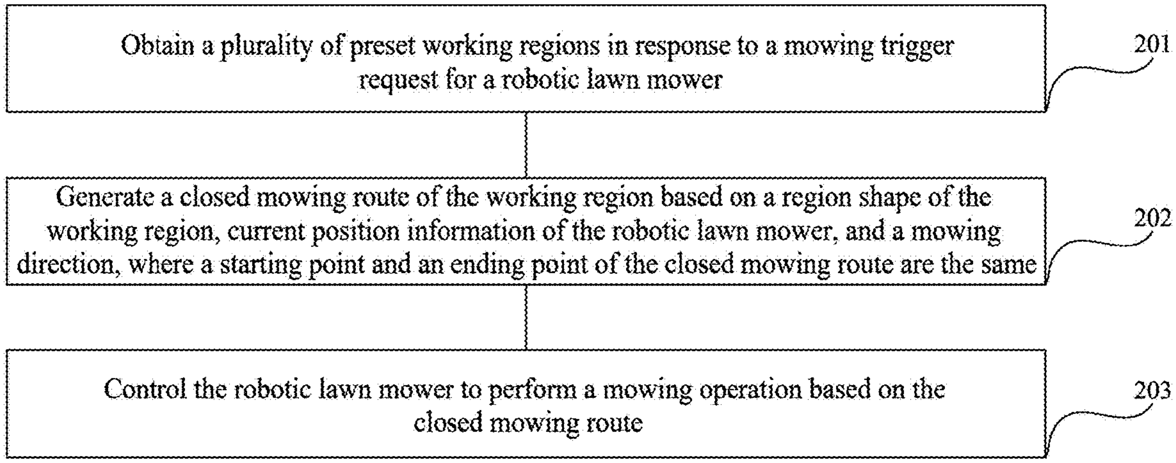
FIG. 5 is a schematic flowchart of another mowing method according to an embodiment of the present disclosure.

Referring to FIG. 5, FIG. 5 is a schematic flowchart of another mowing method according to an embodiment of the present disclosure. The mowing method may have a specific process as follows.

201: Obtain a preset working regions in response to a mowing trigger request for a robotic lawn mower.

The working region is a region where the robotic lawn mower performs mowing operations within a closed region with set boundaries. In this embodiment, the plurality of working regions are independent of each other. The robotic lawn mower enters another operation region for performing a mowing operation after completing a mowing operation in a working region. The mowing trigger request may be triggered by the robotic lawn mower itself, triggered by a server, or triggered by a user by means of hardware or software. As an example, a timed operation is required for the robotic lawn mower, and the mowing trigger request is triggered within a set time. As another example, the server sends a mowing trigger request according to a reported mowing trigging instruction. The user may also input mowing task information by means of an disclosure on a mobile phone, and the mobile phone generates a mowing trigger request for the robotic lawn mower from the mowing task information.

202: Generate a closed mowing route of the working region based on a region shape of the working region, current position information of the robotic lawn mower, and a mowing direction, where a starting point and an ending point of the closed mowing route are the same.

For the specific embodiment of generating the closed mowing route of the working region based on the region shape of the working region, the current position information of the robotic lawn mower, and the mowing direction, reference may be made to the related descriptions of the foregoing embodiments, which will not be repeated here.

203: Control the robotic lawn mower to perform a mowing operation based on the closed mowing route.

In the embodiment of the present disclosure, the robotic lawn mower obtains the preset working region in response to the mowing trigger request for the robotic lawn mower, next, generates the closed mowing route of the working region based on the region shape of the working region, the current position information of the robotic lawn mower, and the mowing direction, where the starting point and the ending point of the closed mowing route are the same, and then, controls the robotic lawn mower to perform the mowing operation based on the closed mowing route. Since the starting point and the ending point of the closed mowing route are the same, the robotic lawn mower does not need to start a mowing operation along a mowing route from a fixed starting point or to return to a fixed ending point after completing a mowing operation. Therefore, the mowing operation may be started at any time by using the current position of the robotic lawn mower as a starting point, which facilitates improving the mowing efficiency. Moreover, since the robotic lawn mower performs the mowing operation based on the closed mowing route whose starting point and ending point are the same, time for the robotic lawn mower to return from the ending point to the starting point may be saved. Therefore, the mowing route of the robotic lawn mower is optimized, the power consumption of the robotic lawn mower is reduced, and the mowing efficiency is improved.

Figure 6:
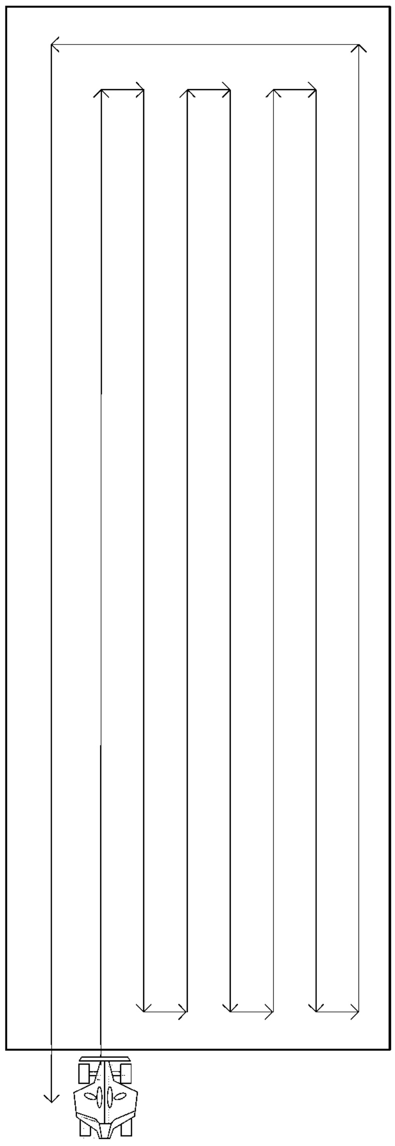
FIG. 6 is a schematic diagram of a scenario of another mowing method according to an embodiment of the present disclosure.

In order to provide further understanding of the mowing method of the present disclosure, further descriptions are provided by way of example of a scenario of intelligent mowing. Referring to FIG. 6, FIG. 6 is a schematic diagram of a scenario of another mowing method according to an embodiment of the present disclosure. Referring to FIG. 6, a zigzag mowing route is generated in a working region by using a position of a robotic lawn mower as a starting point of the mowing route, and finally, an ending point of the mowing route is set at a position the same as the starting point of the mowing route. When the robotic lawn mower performs a mowing operation, the robotic lawn mower starts from the starting point of the mowing route, and travels and mows along the mowing route, and finally, the robotic lawn mower returns to the starting point (ending point) of the mowing route. As can be seen, the starting point and ending point of the mowing route are the same, and therefore, the robotic lawn mower does not need to travel from the ending point more transition routes, along which mowing is not performed, to reach the starting point after completing the mowing operation, thereby skipping generating the transition routes, and saving the time and power wasted by the robotic lawn mower when traveling the transition routes.

In order to better implementing the mowing method of the embodiment of the present disclosure, an embodiment of the present disclosure further provides a mowing apparatus based on the foregoing. The terms have the same meaning as those in the above mowing method, and for detailed implementation details, reference may be made to the descriptions of the embodiments of the method.

Figure 7:
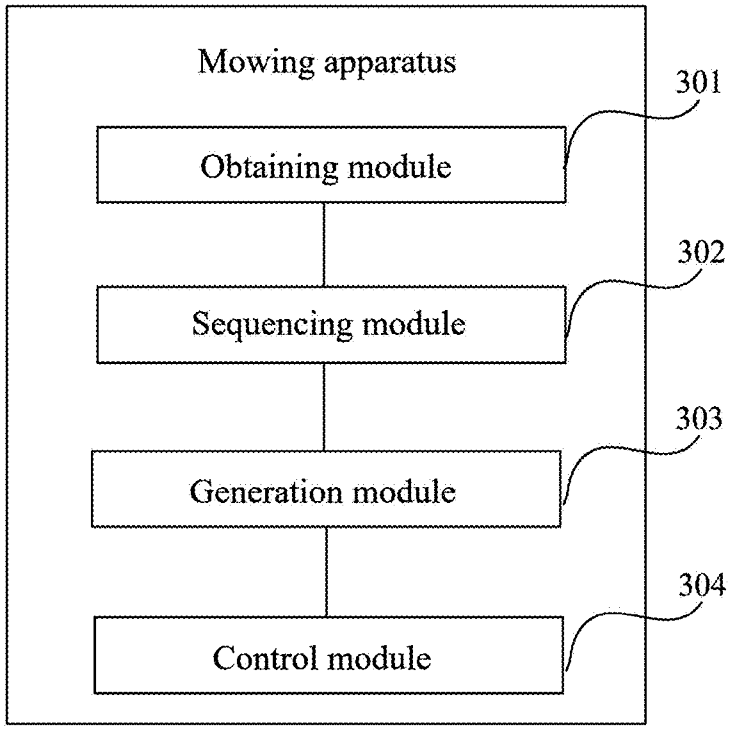
FIG. 7 is a schematic diagram of a structure of a mowing apparatus according to an embodiment of the present disclosure.

Referring to FIG. 7, FIG. 7 is a schematic diagram of a structure of a mowing apparatus according to an embodiment of the present disclosure. The mowing apparatus may include an obtaining module 301, a sequencing module 302, a generation module 303, and a control module 304, which may be particularly provided as follows.

The obtaining module 301 is configured to obtain a plurality of preset working regions in response to a mowing trigger request for a robotic lawn mower.

The sequencing module 302 is configured to output a mowing sequence corresponding to the working regions based on region information of the working regions.

Alternatively, in some embodiments, the sequencing module 302 further includes:

an extraction unit configured to extract region areas and region shapes from the region information of the working regions; and a sequencing unit is configured to determine the mowing sequence corresponding to the working regions based on the region areas and the region shapes.

The generation module 303 is configured to generate a closed mowing route covering all the working regions based on the mowing sequence, current position information of the robotic lawn mower, and a mowing direction, where a starting point and an ending point of the closed mowing route are the same.

Alternatively, in some embodiments, the generation module 303 includes:

a generation unit configured to generate a mowing route corresponding to each of the working regions based on the mowing sequence and the mowing direction of the robotic lawn mower, where the mowing route corresponding to each of the working regions is alternatively parallel to the longest boundary of the corresponding working region;

a connection unit configured to connect the generated mowing routes, to obtain a closed mowing route covering all the working regions, where the starting point and the ending point of the closed mowing route are both located at the current position of the robotic lawn mower.

Alternatively, in some embodiments, the generation unit further includes:

a detection subunit configured to detect a distance between a first mowing order working region and the current position of the robotic lawn mower;

a first generation subunit is configured to generate an initial mowing route of traveling along the mowing direction when it is detected that the distance between the first mowing order working region and the current position of the robotic lawn mower is greater than a preset threshold, where a starting point of the initial mowing route is located at the current position of the robotic lawn mower, and an ending point of the initial mowing route is located within the first mowing order working region; and a second generation subunit configured to generate the mowing route corresponding to each of the working regions in sequence based on the initial mowing route and the mowing sequence, Alternatively, in one embodiment, it is detected whether the initial mowing route passes through a working region; and when it is detected that the initial mowing route passes through a corresponding working region, adjusting the initial mowing route to a mowing route that the robotic lawn mower travels along a mowing boundary of the corresponding working region, where the working region is a closed region formed by connecting a plurality of line segments in sequence, and each of the line segments belongs to a mowing boundary of the working region.

The control module 304 is configured to control the robotic lawn mower to perform a mowing operation based on the closed mowing route.

In the embodiments of the present disclosure, the obtaining module 301 obtains the plurality of preset working regions in response to the mowing trigger request for the robotic lawn mower, then, the sequencing module 302 outputs the mowing sequence corresponding to the working regions based on the region information of the working regions, next, the generation module 303 generates the closed mowing route covering all the working regions based on the mowing sequence, the current position information of the robotic lawn mower, and the mowing direction, where the starting point and the ending point of the closed mowing route are the same, and finally, the control module 304 controls the robotic lawn mower to perform the mowing operation based on the closed mowing route. In the mowing solution provided in the present disclosure, the mowing sequence corresponding to the working regions is output based on the region information of the working regions. Optimization of the mowing sequence may facilitate improving the mowing efficiency. Since the starting point and the ending point of the closed mowing route are the same, the robotic lawn mower does not need to start a mowing operation along a mowing route from a fixed starting point or to return to a fixed ending point after completing a mowing operation. Therefore, the mowing operation may be started at any time by using the current position of the robotic lawn mower as a starting point, which facilitates improving the mowing efficiency. Moreover, since the robotic lawn mower performs the mowing operation based on the closed mowing route whose starting point and ending point are the same, time for the robotic lawn mower to return from the ending point to the starting point may be saved. Therefore, the mowing route of the robotic lawn mower is optimized, the power consumption of the robotic lawn mower is reduced, and the mowing efficiency is improved.

Figure 8:
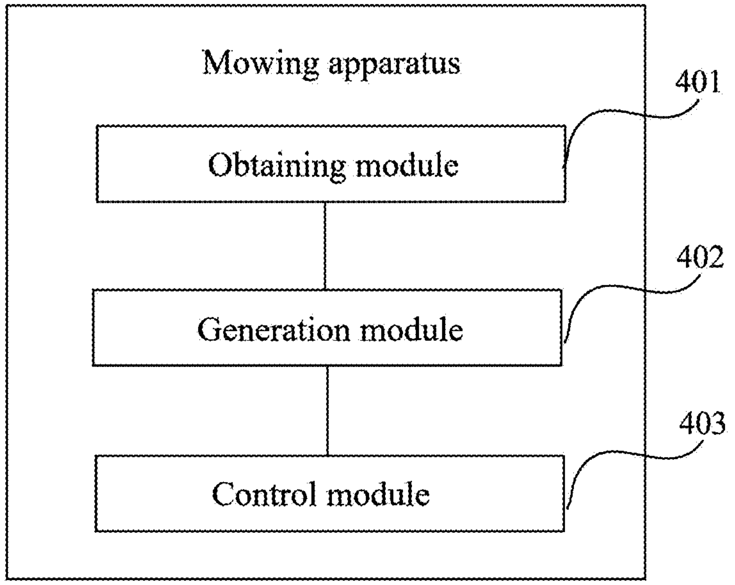
FIG. 8 is a schematic diagram of a structure of another mowing apparatus according to an embodiment of the present disclosure.

Referring to FIG. 8, FIG. 8 is a schematic diagram of a structure of a mowing apparatus according to an embodiment of the present disclosure. The mowing apparatus may include an obtaining module 401, a generation module 402, and a control module 403, which may be particularly provided as follows.

The obtaining module 401 is configured to obtain a preset working region in response to a mowing trigger request for a robotic lawn mower.

The generation module 402 is configured to generate a closed mowing route of the working region based on a region shape of the working region, current position information of the robotic lawn mower, and a mowing direction, where a starting point and an ending point of the closed mowing route are the same.

The control module 403 is configured to control the robotic lawn mower to perform a mowing operation based on the closed mowing route.

The intelligent terminal, the server or the robotic lawn mower can generate the zigzag mowing route, for particular embodiments of which, reference may be made to the related descriptions of the foregoing embodiments, which will not be repeated here.

In the embodiment of the present disclosure, the obtaining module 401 obtains the preset working region in response to the mowing trigger request for the robotic lawn mower, then, the generation module 402 generates the closed mowing route of the working region based on the region shape of the working region, the current position information of the robotic lawn mower, and the mowing direction, where the starting point and the ending point of the closed mowing route are the same, and then, the control module 403 controls the robotic lawn mower to perform the mowing operation based on the closed mowing route. Since the starting point and the ending point of the closed mowing route are the same, the robotic lawn mower does not need to start a mowing operation along a mowing route from a fixed starting point or to return to a fixed ending point after completing a mowing operation. Therefore, the mowing operation may be started at any time by using the current position of the robotic lawn mower as a starting point, which facilitates improving the mowing efficiency. Moreover, since the robotic lawn mower performs the mowing operation based on the closed mowing route whose starting point and ending point are the same, time for the robotic lawn mower to return from the ending point to the starting point may be saved. Therefore, the mowing route of the robotic lawn mower is optimized, the power consumption of the robotic lawn mower is reduced, and the mowing efficiency is improved.

Figure 9:
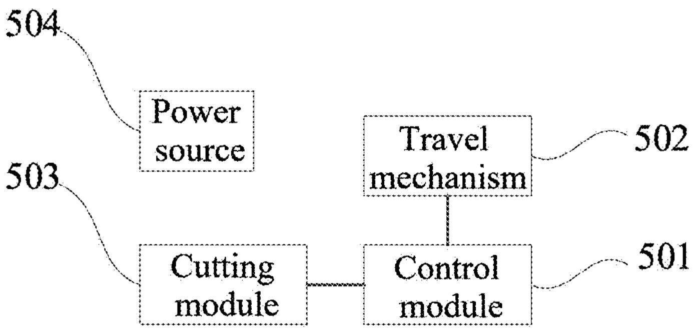
FIG. 9 is a schematic diagram of a structure of a robotic lawn mower according to an embodiment of the present disclosure.

In addition, an embodiment of the present disclosure further provides a robotic lawn mower. As shown in FIG. 9, a schematic diagram of a structure of the robotic lawn mower according to the embodiment of the present disclosure is shown.

Specifically, the robotic lawn mower may include components such as a control module 501, a travel mechanism 502, a cutting module 503, and a power source 504. Those skilled in the art will appreciate that the structure of the robotic lawn mower shown in FIG. 9 does not impose a limitation on the robotic lawn mower, and may include more or fewer components than those shown, a combination of some components or a different arrangement of components. In this figure:

The control module 501 is a control center of the robotic lawn mower, the control module 501 may particularly include components such as a central process unit (CPU), a memory, an input/output port, a system bus, a timer/counter, a digital-to-analog converter and an analog-to-digital converter. The CPU performs various functions of the robotic lawn mower and processes data by running or executing software programs and/or modules stored in the memory and calling the data stored in the memory. Alternatively, the CPU can integrate an application processor and a modem processor, where the application processor mainly processes operating systems and applications, etc., and the modem processor mainly processes wireless communications. It may be understood that the above mentioned modem processor may also not be integrated into the CPU.

The memory may be used to store software programs and modules, and the CPU executes various functional applications and processes data by running the software programs and modules stored in the memory. The memory may mainly include a program storage area and a data storage area, where the program storage area can store an operating system, an application required by at least one function (such as a sound play function, image play function, etc.); and the data storage area can store data created during the use of the robotic lawn mower, or the like. In addition, the memory may include a high-speed random access memory, and may also include a non-volatile memory, such as at least one disk storage device and a flash memory device, or other volatile solid-state storage devices. Accordingly, the memory may also include a memory controller to provide an access by the CPU to the memory.

The travel mechanism 502 is electrically connected to the control module 501 for adjusting the travel speed and direction of the robotic lawn mower in response to control signals transmitted by the control module 501 to implement the self-moving function of the robotic lawn mower.

The cutting module 503 is electrically connected to the control module 501 and is configured to adjust the height and speed of the cutter disc in response to the control signals transmitted by the control module to carry out the mowing operation.

The power source 504 may be logically connected to the control module 501 by means of a power management system, so as to implement the functions, such as charging management, discharging management and power consumption management, by means of the power management system. The power source 504 may also include any of more than one DC or AC power source, a recharging system, a power failure detection circuit, a power converter or an inverter, and a power status indicator, etc.

Although not shown, the robotic lawn mower may also include a communication module, a sensor module, a prompt module, etc., which will not be repeated here.

The communication module is configured to transmit and receive signals during transmitting and receiving information, and to enable signal transmitting and receiving between a user device and a base station or a server by means of establishing a communication connection with the user device, the base station or the server.

The sensor module is configured to collect internal or external environmental information, and to feed the collected environmental data back to the control module for making a decision, thereby achieving the functions of precise positioning and intelligent obstacle avoidance of the robotic lawn mower. Alternatively, the sensor may include an ultrasonic sensor, an infrared sensor, an impact sensor, a rain sensor, a LIDAR sensor, an inertial measurement unit, a tachometer, an image sensor, a position sensor, and other sensors, which are not limited.

The prompt module is configured to indicate the current operating status of the robotic lawn mower to the user. In this scheme, the prompt module includes, but is not limited to, an indicator light, a buzzer, and the like. For example, the robotic lawn mower can indicate to the user the current status of the power source, the operating status of an electric motor, the operating status of the sensor, etc. by means of the indicator light. For another example, if a malfunction or theft of the robotic lawn mower is detected, an alert can be provided by the buzzer.

Particularly, in this embodiment, the processor of the control module 501 may load executable files corresponding to the processes of one or more applications into the memory, and the applications stored in the memory are run by the processor in accordance with the following instructions so as to achieve various functions:

For the implementation of the above various operations, reference may be made to the foregoing embodiments, which will not be repeated here.

A plurality of preset working regions are obtained in response to a mowing trigger request for a robotic lawn mower; then, a mowing sequence corresponding to the working regions is output based on region information of the working regions; next, a closed mowing route covering all the working regions is generated based on the mowing sequence, current position information of the robotic lawn mower, and a mowing direction, where a starting point and an ending point of the closed mowing route are the same; and finally, the robotic lawn mower is controlled to perform a mowing operation based on the closed mowing route. Alternatively, a preset working region is obtained in response to a mowing trigger request for a robotic lawn mower; next, a closed mowing route of the working region is generated based on a region shape of the working region, current position information of the robotic lawn mower, and a mowing direction, where a starting point and an ending point of the closed mowing route are the same; and then, the robotic lawn mower is controlled to perform a mowing operation based on the closed mowing route.

It may be understood that since the starting point and the ending point of the closed mowing route are the same, the robotic lawn mower does not need to start a mowing operation along a mowing route from a fixed starting point or to return to a fixed ending point after completing a mowing operation. Therefore, the mowing operation may be started at any time by using the current position of the robotic lawn mower as a starting point, which facilitates improving the mowing efficiency. Moreover, since the robotic lawn mower performs the mowing operation based on the closed mowing route whose starting point and ending point are the same, time for the robotic lawn mower to return from the ending point to the starting point may be saved. Therefore, the mowing route of the robotic lawn mower is optimized, the power consumption of the robotic lawn mower is reduced, and the mowing efficiency is improved.

Those of ordinary skill in the art will appreciate that all or some of the steps of the various methods of the foregoing embodiments may be completed by the instructions, or be completed by controlling associated hardware by means of the instructions which may be stored in a computer-readable storage medium and loaded and executed by the processor.

To this end, an embodiment of the present disclosure provides a storage medium storing a plurality of instructions which can be loaded by a processor to cause the steps of any of the mowing methods provided in the embodiments of the present disclosure to be carried out. For example, the instructions may cause the following steps to be carried out:

obtaining a plurality of preset working regions in response to a mowing trigger request for a robotic lawn mower; then, outputting a mowing sequence corresponding to the working regions based on region information of the working regions; next, generating a closed mowing route covering all the working regions based on the mowing sequence, current position information of the robotic lawn mower, and a mowing direction, where a starting point and an ending point of the closed mowing route are the same; and finally, controlling the robotic lawn mower to perform a mowing operation based on the closed mowing route. Alternatively, the instructions may cause the following steps to be carried out: obtaining a preset working region in response to a mowing trigger request for a robotic lawn mower; next, generating a closed mowing route of the working region based on a region shape of the working region, current position information of the robotic lawn mower, and a mowing direction, where a starting point and an ending point of the closed mowing route are the same; and then, controlling the robotic lawn mower to perform a mowing operation based on the closed mowing route.

For the implementation of the above various operations, reference may be made to the foregoing embodiments, which will not be repeated here.

The storage medium may include a read only memory (ROM), a random access memory (RAM), a magnetic disk or an optical disk, and the like.

With the instructions stored in the storage medium, the steps of any one of the mowing methods provided in the embodiments of the present disclosure may be performed, and the benefits achievable by any one of the mowing methods provided in the embodiments of the present disclosure can thus be achieved. See the foregoing embodiments for details, which will not be repeated here.

The mowing method and apparatus, the robotic lawn mower, and the storage medium provided in the embodiments of the present disclosure are described in detail above, and the principles and implementations of the present disclosure are set forth by way of specific examples herein. The descriptions of the foregoing embodiments are merely intended to facilitate understanding of the method according to the present disclosure and the core idea thereof. In addition, for those skilled in the art, changes may be made to the specific implementations and disclosure range based on the idea of the present disclosure. In conclusion, the contents of this specification should not be construed as a limitation to the present disclosure.

In the embodiment of the present disclosure, the plurality of preset working regions are obtained in response to the mowing trigger request for the robotic lawn mower; then, the mowing sequence corresponding to the working regions is output based on the region information of the working regions; next, the closed mowing route covering all the working regions is generated based on the mowing sequence, the current position information of the robotic lawn mower, and the mowing direction, where the starting point and the ending point of the closed mowing route are the same; and finally, the robotic lawn mower is controlled to perform the mowing operation based on the closed mowing route. In the mowing solution provided in the present disclosure, the mowing sequence corresponding to the working regions is output based on the region information of the working regions. Optimization of the mowing sequence may facilitate improving the mowing efficiency. Since the starting point and the ending point of the closed mowing route are the same, the robotic lawn mower does not need to start a mowing operation along a mowing route from a fixed starting point or to return to a fixed ending point after completing a mowing operation. Therefore, the mowing operation may be started at any time by using the current position of the robotic lawn mower as a starting point, which facilitates improving the mowing efficiency. Moreover, since the robotic lawn mower performs the mowing operation based on the closed mowing route whose starting point and ending point are the same, time for the robotic lawn mower to return from the ending point to the starting point may be saved. Therefore, the mowing route of the robotic lawn mower is optimized, the power consumption of the robotic lawn mower is reduced, and the mowing efficiency is improved.

In the embodiment of the present disclosure, the robotic lawn mower obtains the preset working region in response to the mowing trigger request for the robotic lawn mower, next, generates the closed mowing route of the working region based on the region shape of the working region, the current position information of the robotic lawn mower, and the mowing direction, where the starting point and the ending point of the closed mowing route are the same, and then, controls the robotic lawn mower to perform the mowing operation based on the closed mowing route. Since the starting point and the ending point of the closed mowing route are the same, the robotic lawn mower does not need to start a mowing operation along a mowing route from a fixed starting point or to return to a fixed ending point after completing a mowing operation. Therefore, the mowing operation may be started at any time by using the current position of the robotic lawn mower as a starting point, which facilitates improving the mowing efficiency. Moreover, since the robotic lawn mower performs the mowing operation based on the closed mowing route whose starting point and ending point are the same, time for the robotic lawn mower to return from the ending point to the starting point may be saved. Therefore, the mowing route of the robotic lawn mower is optimized, the power consumption of the robotic lawn mower is reduced, and the mowing efficiency is improved.

What is claimed is:

1. A mowing method, comprising:

obtaining a plurality of preset working regions in response to a mowing trigger request for a robotic lawn mower, wherein the plurality of working regions are spatially separated from each other;

outputting a mowing sequence corresponding to the working regions based on region information of the working regions;

generating a first mowing route corresponding to each of the working regions based on the mowing sequence, and the mowing direction of the robotic lawn mower; and obtaining the closed mowing route that covering the working regions by connecting the first mowing routes corresponding to the working regions, wherein the starting point and the ending point of the closed mowing route are both located at athe current position of the robotic lawn mower; and controlling the robotic lawn mower to perform a mowing operation based on the closed mowing route.

2. The mowing method according to claim 1, wherein the outputting the mowing sequence corresponding to the working regions based on region information of the working regions comprises:

extracting region areas and region shapes of the working regions from the region information; and determining the mowing sequence corresponding to the working regions based on the region areas and the region shapes.

3. The mowing method according to claim 1, wherein the generating the first mowing route corresponding to each of the working regions based on the mowing sequence, and the mowing direction of the robotic lawn mower comprises:

detecting a distance between a first mowing sequence working region and the current position of the robotic lawn mower;

generating an initial mowing route of traveling along the mowing direction when it is detected that the distance between the first mowing sequence working region and the current position of the robotic lawn mower is greater than a preset threshold, wherein a starting point of the initial mowing route is located at the current position of the robotic lawn mower, and an ending point of the initial mowing route is located within the first mowing sequence working region; and generating the mowing route corresponding to each of the working regions in sequence based on the initial mowing route and the mowing sequence.

4. The mowing method according to claim 3, wherein the generating the initial mowing route of traveling along the mowing direction comprises:

detecting whether the initial mowing route passes through a working region; and when it is detected that the initial mowing route passes through a corresponding working region, adjusting the initial mowing route to a second mowing route in which the robotic lawn mower travels along a mowing boundary of the corresponding working region, wherein the corresponding working region is a closed region formed by connecting a plurality of line segments in sequence, and each of the line segments belongs to the mowing boundary of the corresponding working region.

5. The mowing method according to claims 1, wherein the first mowing route corresponding to each of the working regions is parallel to a longest boundary of the corresponding working region.

6. The mowing method according to claim 1, wherein the outputting the mowing sequence corresponding to the working regions based on the region information of the working regions comprises:

extracting region area information from the region information of the working regions;

determining a region area of each of the working regions; and determining the mowing sequence by designating a working region having a largest region area as a working region ranked first in the mowing sequence and sorting the working regions based on the respective region areas.

7. The mowing method according to claim 1, wherein, when the mowing direction of the robotic lawn mower is opposite to a direction from the current position of the robotic lawn mower toward a working region ranked first in the mowing sequence, the generated closed mowing route includes a turning back path segment extending toward the working region ranked first in the mowing sequence.

8. A mowing method, comprising:

obtaining a preset working region in response to a mowing trigger request for a robotic lawn mower, the plurality of working regions are spatially separated from of each other;

generating a first mowing route corresponding to each of the working regions based on the mowing sequence, and the mowing direction of the robotic lawn mower; and obtaining the closed mowing route that covering the working regions by connecting the first mowing routes corresponding to the working regions, wherein the starting point and the ending point of the closed mowing route are both located at the current position of the robotic lawn mower; and controlling the robotic lawn mower to perform a mowing operation based on the closed mowing route.

9. A robotic lawn mower, comprising a memory, a processor, and a computer program stored on the memory and executable on the processor, wherein the processor, when executing the program, implements the steps of a mowing method, the mowing method comprises:

obtaining a plurality of preset working regions in response to a mowing trigger request for a robotic lawn mower, the plurality of working regions are spatially separated from of each other;

outputting a mowing sequence corresponding to the working regions based on region information of the working regions;

generating a first mowing route corresponding to each of the working regions based on the mowing sequence, and the mowing direction of the robotic lawn mower; and obtaining the closed mowing route that covering the working regions by connecting the first mowing routes corresponding to the working regions, wherein the starting point and the ending point of the closed mowing route are both located at the current position of the robotic lawn mower; and controlling the robotic lawn mower to perform a mowing operation based on the closed mowing route.

10. The robotic lawn mower according to claim 9, wherein the outputting the mowing sequence corresponding to the working regions based on region information of the working regions comprises:

extracting region areas and region shapes of the working regions from the region information; and determining the mowing sequence corresponding to the working regions based on the region areas and the region shapes.

11. The robotic lawn mower according to claim 9, wherein the generating the first mowing route corresponding to each of the working regions based on the mowing sequence, and the mowing direction of the robotic lawn mower comprises:

detecting a distance between a first mowing sequence working region and the current position of the robotic lawn mower;

generating an initial mowing route of traveling along the mowing direction when it is detected that the distance between the first mowing sequence working region and the current position of the robotic lawn mower is greater than a preset threshold, wherein a starting point of the initial mowing route is located at the current position of the robotic lawn mower, and an ending point of the initial mowing route is located within the first mowing sequence working region; and generating the mowing route corresponding to each of the working regions in sequence based on the initial mowing route and the mowing sequence.

12. The robotic lawn mower according to claim 11, wherein the generating the initial mowing route of traveling along the mowing direction comprises:

detecting whether the initial mowing route passes through a working region; and when it is detected that the initial mowing route passes through a corresponding working region, adjusting the initial mowing route to a second mowing route in which the robotic lawn mower travels along a mowing boundary of the corresponding working region, wherein the working region is a closed region formed by connecting a plurality of line segments in sequence, and each of the line segments belongs to the mowing boundary of the working region.

13. The robotic lawn mower according to claims 9, wherein the first mowing route corresponding to each of the working regions is parallel to a longest boundary of the corresponding working region.

* * * * *